(12) United States Patent
Frishman

(10) Patent No.: US 10,080,019 B2
(45) Date of Patent: Sep. 18, 2018

(54) PARALLEL ENCODING FOR WIRELESS DISPLAYS

(71) Applicant: Intel Corporation, Santa Clara, CA (US)

(72) Inventor: Yaniv Frishman, Kiryat Ono (IL)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 14/569,071

(22) Filed: Dec. 12, 2014

(65) Prior Publication Data

US 2016/0088300 A1 Mar. 24, 2016

Related U.S. Application Data

(60) Provisional application No. 62/052,602, filed on Sep. 19, 2014.

(51) Int. Cl.
| | |
|---|---|
| *H04N 19/124* | (2014.01) |
| *H04N 19/146* | (2014.01) |
| *H04N 19/174* | (2014.01) |
| *H04N 19/436* | (2014.01) |
| *G06F 3/14* | (2006.01) |
| *G09G 5/39* | (2006.01) |

(52) U.S. Cl.
CPC ............ *H04N 19/124* (2014.11); *G06F 3/14* (2013.01); *G09G 5/39* (2013.01); *H04N 19/146* (2014.11); *H04N 19/174* (2014.11); *H04N 19/436* (2014.11); *G09G 2340/02* (2013.01); *G09G 2352/00* (2013.01); *G09G 2360/08* (2013.01); *G09G 2360/122* (2013.01); *G09G 2370/10* (2013.01); *G09G 2370/16* (2013.01)

(58) Field of Classification Search
CPC .. H04N 19/124; H04N 19/146; H04N 19/174; H04N 19/436; H04N 5/14
USPC ...................................... 375/240.03
See application file for complete search history.

(56) References Cited

U.S. PATENT DOCUMENTS

| | | | |
|---|---|---|---|
| 5,949,490 A | 9/1999 | Borgwardt et al. | |
| 2009/0238259 A1* | 9/2009 | Yeh ......... | H04N 19/50 375/240.01 |
| 2010/0189183 A1* | 7/2010 | Gu ............ | H04N 21/23439 375/240.28 |
| 2011/0050851 A1* | 3/2011 | Chen ......... | H04N 13/0029 348/43 |

(Continued)

FOREIGN PATENT DOCUMENTS

| | | |
|---|---|---|
| WO | 2013008942 A1 | 1/2013 |
| WO | 2013153226 A2 | 10/2013 |

OTHER PUBLICATIONS

International Search Report and Written Opinion for PCT/US2015/045884, dated Dec. 21, 2015, 16 pages.

(Continued)

*Primary Examiner* — Jamie Atala
*Assistant Examiner* — Ayman Abaza
(74) *Attorney, Agent, or Firm* — Jordan IP Law, LLC

(57) ABSTRACT

Systems, apparatus and methods are described including operations for performing, via a frame division module, frame division of video frames into sections to form a first frame section stream and a second frame section stream; and/or encoding, via a first and a second encoder, the first frame section stream via the first encoder and the second frame section stream via the second encoder.

20 Claims, 11 Drawing Sheets

(56) References Cited

U.S. PATENT DOCUMENTS

| | | | | |
|---|---|---|---|---|
| 2011/0051811 A1* | 3/2011 | Wang | ...................... | H04N 19/50 |
| | | | | 375/240.12 |
| 2012/0170663 A1* | 7/2012 | Leigh | ...................... | H04N 19/63 |
| | | | | 375/240.19 |
| 2012/0183079 A1* | 7/2012 | Yoshimatsu | ........... | H04N 19/44 |
| | | | | 375/240.25 |
| 2014/0270168 A1* | 9/2014 | Geagan, III | ......... | H04N 19/167 |
| | | | | 380/210 |

OTHER PUBLICATIONS

European Search Report for EP Patent Application No. 15841748.5, dated Mar. 20, 2018, 11 pages.

* cited by examiner

400

Perform Frame Division of Video Frames Into Sections To Form a First Frame Section Stream and a Second Frame Section Stream
402

Encode The First Frame Section Stream Via A First Encoder And The Second Frame Section Stream Via A Second Encoder
404

PARALLEL ENCODING FOR WIRELESS DISPLAYS

RELATED APPLICATIONS

The present application claims the benefit of U.S. Provisional Application No. 62/052,602, filed 19 Sep. 2014, and titled "PARALLEL ENCODING FOR WIRELESS DISPLAYS".

BACKGROUND

A video encoder compresses video information so that more information can be sent over a given bandwidth. The compressed signal may then be transmitted to a receiver that decodes or decompresses the signal prior to display.

Compression of video for wireless display at high resolutions (e.g. 3840×2160 at 60 frames per second) often requires a powerful encoder. However, low power system-on-chips (SoCs) may have a limited clock speed (e.g., in order to reduce power consumption).

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
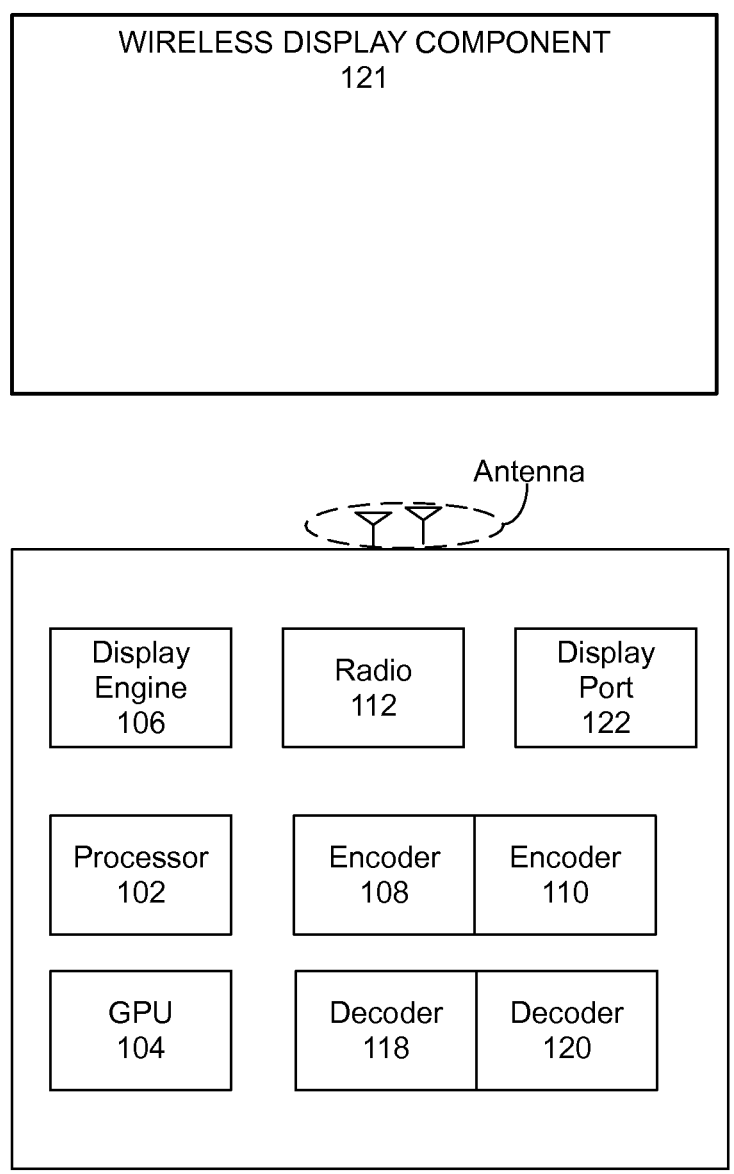
FIG. 1 is an illustrative diagram of an example video processing system.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for parallel coding for wireless displays.

As described above, compression of video for wireless display at high resolutions (e.g. 3840×2160 at 60 frames per second) often requires a powerful encoder. However, low power system-on-chips (SoCs) may have a limited clock speed (e.g., in order to reduce power consumption).

As will be described in more detail below, conversely, some implementations of the concepts described herein may perform video compression in parallel using two compression engines. Accordingly, some implementations of the concepts described herein may meet video compression performance requirements for wireless displays while using a low clock frequency hardware (HW) video encoder.

FIG. 1 is an illustrative diagram of an example video processing system 100, arranged in accordance with at least some implementations of the present disclosure. In various implementations, video processing system 100 may include several system level components, such as a central processing unit (CPU) 102, graphics processing unit (GPU) 104, display engine 106, video encoders 108/110, a wireless radio 112 (e.g., a radio frequency-type (RF) transceiver), video decoders 118/120 (e.g., these decoders may be implemented as a decoder loop within the video encoders 108/110), wireless display 121, display port/HDMI sources 122, the like, and/or combinations thereof.

In some examples, it will be understood that many of the components of video processing system 100 may be incorporated as parts of a system-on-chip (SoC) device. Also, in some examples, video processing system 100 may include additional items that have not been shown in FIG. 1 for the sake of clarity. For example, video processing system 100 may include additional items such as a speaker, a microphone, an accelerometer, memory, a router, network interface logic, etc. that have not been shown in FIG. 1 for the sake of clarity.

System 100 may be embodied in varying physical styles or form factors, such as a small form factor device. In various embodiments, for example, system 100 may be implemented as a mobile computing device a having wireless capabilities. A mobile computing device may refer to any device having a processing system and a mobile power source or supply, such as one or more batteries, for example.

Processor 102 may be implemented as a Complex Instruction Set Computer (CISC) or Reduced Instruction Set Computer (RISC) processors, x86 instruction set compatible processors, multi-core, system-on-chip (SoC), or any other microprocessor or central processing unit (CPU). In various implementations, processor 102 may be dual-core processor(s), dual-core mobile processor(s), and so forth.

Graphics processing unit (GPU) 104 may perform processing of images such as still or video for display. An analog or digital interface may be used to communicatively couple graphics processing unit (GPU) 104 and wireless display 121. For example, the interface may be any of a wireless High-Definition Multimedia Interface, wireless DisplayPort, wireless HDMI, wireless HD compliant techniques, and/or the like. Graphics processing unit (GPU) 104 may be integrated into processor 902 or a chipset.

Radio 112 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 120 may include any wireless type monitor or display. Display 120 may include, for example, a computer display screen, touch screen display, video monitor, television-like device, and/or a television. Display 120 may be digital and/or analog. In various implementations, display 120 may be a holographic display. Also, display 120 may be a transparent surface that may receive a visual projection. Such projections may convey various forms of information, images, and/or objects. For example, such projections may be a visual overlay for a mobile augmented reality (MAR) application.

In operation, some implementations of the concepts described herein may perform video compression in parallel using two compression engines. Accordingly, some implementations of the concepts described herein may meet video compression performance requirements for wireless displays while using a low clock frequency hardware (HW) video encoder.

In operation, some implementations of the concepts described herein may be an improvement as compared to conventional solutions since the required clock frequency may be reduced. Accordingly, some implementations of the concepts described herein may be particularly suited to be used in low power devices with a low clock frequency. For example, the concepts described herein may be particularly suited for implementation in low power/high resolution wireless display systems. In one example, some implementations of the concepts described herein might support a 4K wireless display using low power system-on-chips (SoCs), such as might be used in mobile platforms.

As will be discussed in greater detail below, video processing system 100 may be used to perform some or all of the various functions discussed below in connection with FIGS. 4 and/or 7.

Figure 2:
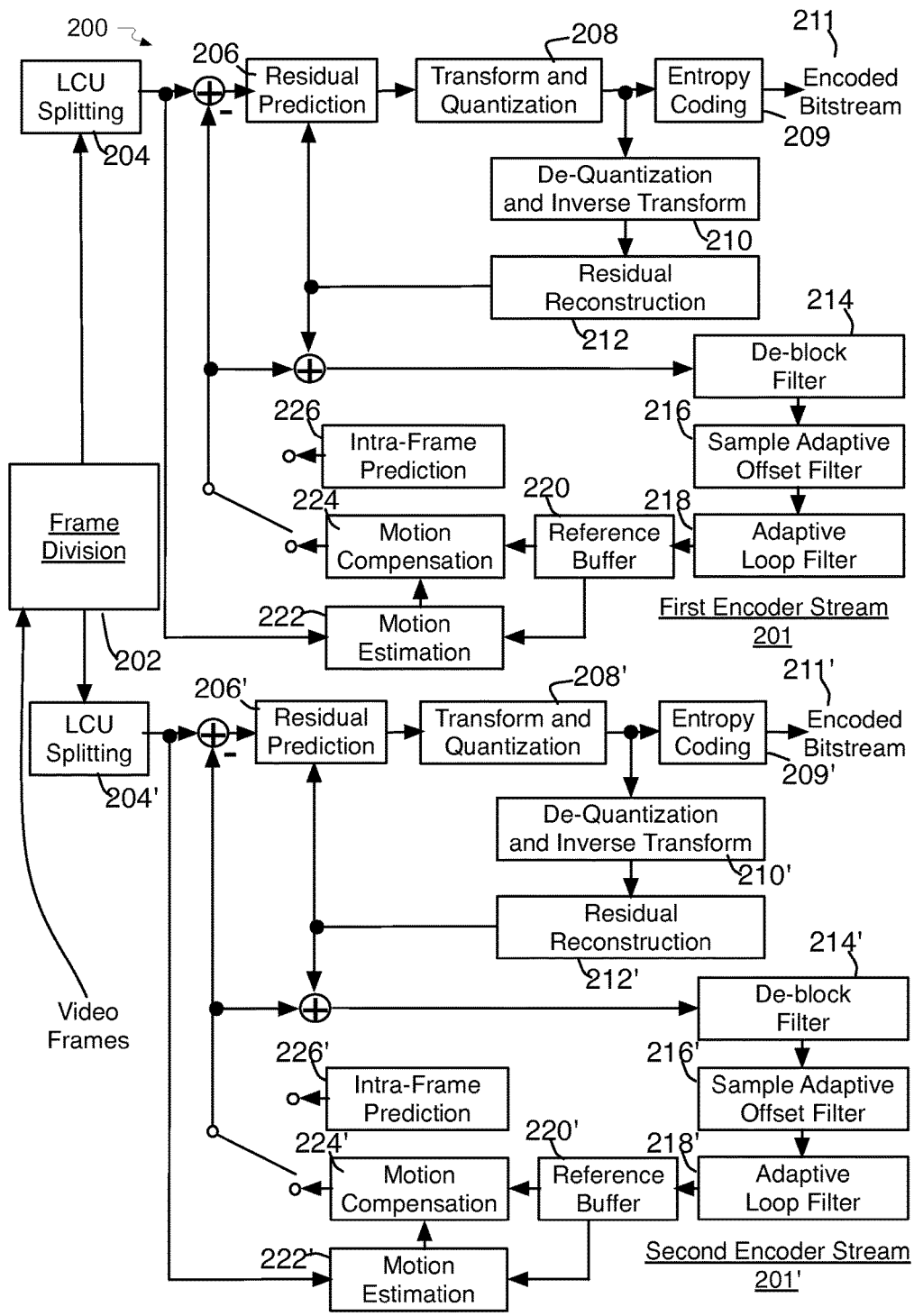
FIG. 2 is an illustrative diagram of an example video coding system.

FIG. 2 is an illustrative diagram of an example video coding system 200, arranged in accordance with at least some implementations of the present disclosure. In various implementations, video coding system 200 may be configured to undertake video coding and/or implement video codecs according to one or more advanced video codec standards, such as, for example, the High Efficiency Video Coding (HEVC) H.265 video compression standard, Advanced Video Coding (MPEG-4 AVC), or the like. Further, in various embodiments, video coding system 200 may be implemented as part of an image processor, video processor, and/or media.

As used herein, the term "coder" may refer to an encoder and/or a decoder. Similarly, as used herein, the term "coding" may refer to encoding via an encoder and/or decoding via a decoder. For example video encoders and video decoders may both be examples of coders capable of coding.

In some examples, video coding system 200 may include additional items that have not been shown in FIG. 2 for the sake of clarity. For example, video coding system 200 may include a processor, a radio frequency-type (RF) transceiver, a display, and/or an antenna. Further, video coding system 200 may include additional items such as a speaker, a microphone, an accelerometer, memory, a router, network interface logic, etc. that have not been shown in FIG. 2 for the sake of clarity.

In some examples, video coding system 200 may perform stream division operations operations. For example, two separate streams (e.g., first encoder stream 201 and second encoder stream 201'), are illustrated; however, any number of encoder streams may be utilized in addition to the two listed here.

For example, a frame division module 202 may perform a division of individual video frames into two sections, where each section is allocated to one of the two encoder streams (e.g., first stream 201 and second stream 201'). In such an example, a first frame division may be processed via first encoder stream 201 and second frame division may be processed via second encoder stream 201'. Information associated with the first frame division (e.g., such as prediction mode, reconstructed pixel and so on) may be used for coding of in first encoder stream 201. Similarly, information associated with the second frame division (e.g., such as prediction mode, reconstructed pixel and so on) may be used for coding of in second encoder stream 201'.

For example, during the operation of video coding system 200 on first encoder stream 201, current video information may be provided to frame division module 202 in the form of a frame of video data. The current video frame may be divided into two sections by frame division module 202. A first half of the individual divided frame sections of a current video frame may be split into Largest Coding Units (LCUs) at module 204 and then passed to a residual prediction module 206.

The output of residual prediction module 206 may be subjected to known video transform and quantization processes by a transform and quantization module 208. The output of transform and quantization module 208 may be provided to an entropy coding module 209 (which may be output as encoded bitstream 211) and to a de-quantization and inverse transform module 210. De-quantization and inverse transform module 210 may implement the inverse of the operations undertaken by transform and quantization module 208 to provide the output of residual prediction module 206 to a residual reconstruction module 212. Those skilled in the art may recognize that transform and quantization modules and de-quantization and inverse transform modules as described herein may employ scaling techniques. The output of residual reconstruction module 212 may be fed back to residual prediction module 206 and may also be provided to a loop including a de-blocking filter 214, a sample adaptive offset filter 216, an adaptive loop filter 218, a buffer 220, a motion estimation module 222, a motion compensation module 224 and an intra-frame prediction module 226, or the like. As shown in FIG. 2, the output of either motion compensation module 224 or intra-frame prediction module 226 is both combined with the output of residual prediction module 206 as input to de-blocking filter 214, and is differenced with the output of LCU splitting module 204 to act as input to residual prediction module 206.

Similarly, during the operation of video coding system 200 on second encoder stream 201', a second half of the individual divided frame sections of a current video frame may be provided to LCU splitting module 204'. The current divided frame section may be split into Largest Coding Units (LCUs) at module 204' and then passed to a transform and quantization module 208'.

Transform and quantization module 208' may perform known video transform and quantization processes. The output of transform and quantization module 208' may be provided to an entropy coding module 209' (which may be output as encoded bitstream 211') and to a de-quantization and inverse transform module 210'. De-quantization and inverse transform module 210' may implement the inverse of the operations undertaken by transform and quantization module 208' to provide the output of LCU module 204' to a residual reconstruction module 212' and may also be provided to a loop including a de-blocking filter 214', a sample adaptive offset filter 216', an adaptive loop filter 218', a buffer 220', a motion estimation module 222', a motion compensation module 224' and an intra-frame prediction module 226'. Those skilled in the art may recognize that transform and quantization modules and de-quantization and inverse transform modules as described herein may employ scaling techniques. The output of residual reconstruction module 212' may be fed back to residual prediction module 206' and may also be provided to a loop including a de-blocking filter 214', a sample adaptive offset filter 216', an adaptive loop filter 218', a buffer 220', a motion estimation module 222', a motion compensation module 224' and an intra-frame prediction module 226', or the like. As shown in FIG. 2, the output of either motion compensation module 224' or intra-frame prediction module 226' is both combined with the output of de-quantization and inverse transform module 210' as input to de-blocking filter 214', and is differenced with the output of LCU splitting module 204' to act as input to transform and quantization module 208'.

As will be discussed in greater detail below, video coding system 200 may be used to perform some or all of the various functions discussed below in connection with FIGS. 4 and/or 7.

Figure 3A:
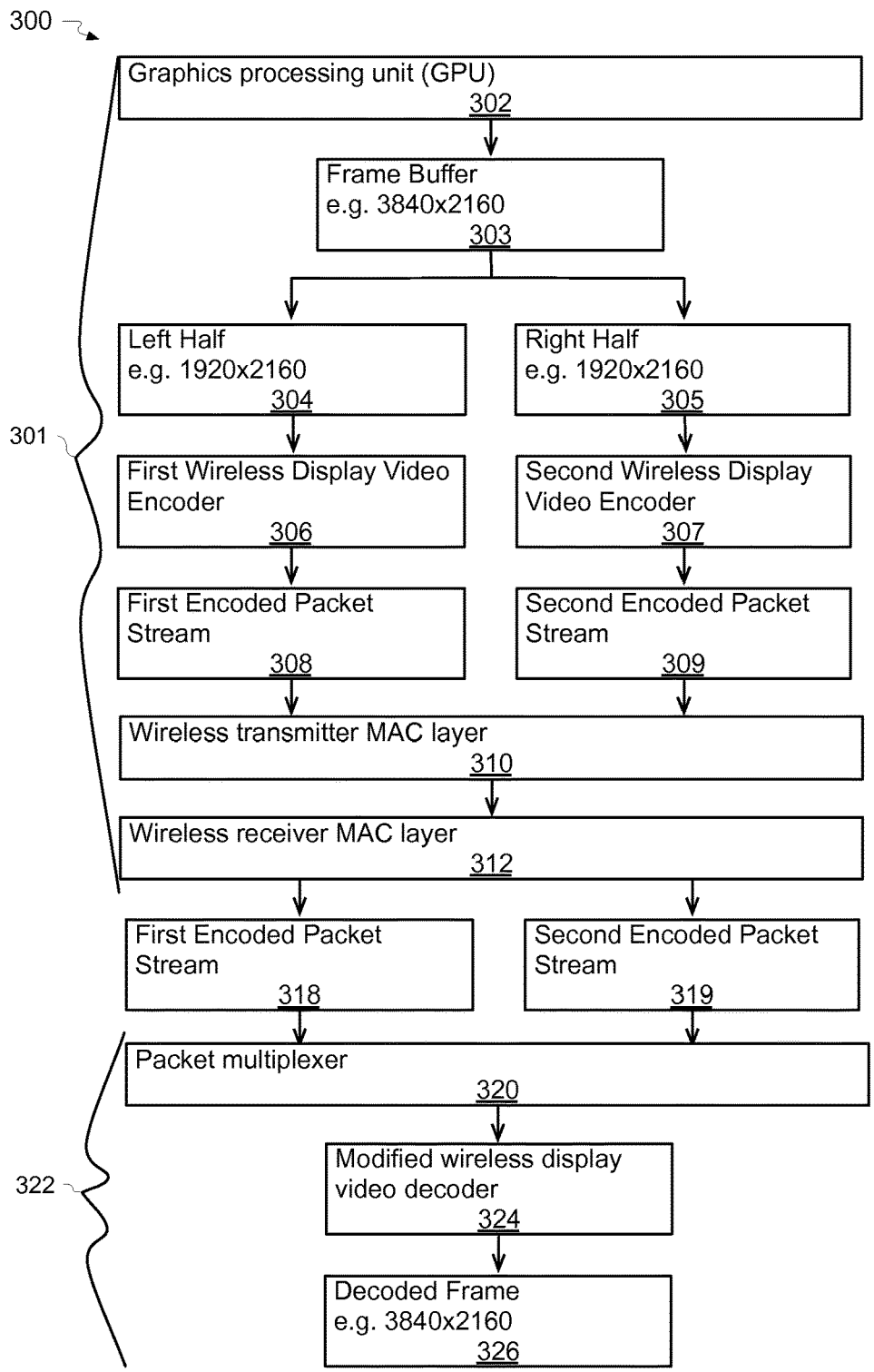
FIG. 3A is an illustrative diagram of an example video processing scheme.

FIG. 3A is a diagram illustrating an example video processing scheme 300, arranged in accordance with at least some implementations of the present disclosure. Scheme 300 may include one or more operations, functions or actions as illustrated by one or more of operations 302, etc.

At transmitter 301 side, graphics processing unit (GPU) 302 may generate a high resolution image (e.g., for 3840 by 2160 pixels (4K)) and stored in frame buffer 303.

Then the image may be split into two parts 304/305. For example, the image may be split into two parts where there is a left half and a right half. Such an image split may be implemented in hardware, firmware, and/or software.

Next, each of the two halves 304/305 of the image may be encoded in parallel. For example, each of the two halves of the image may be encoded in parallel via two separate video encoders 306/307 that run in parallel.

In such an implementation, using two video encoders may allow for a reduced clock frequency and hence a reduced power consumption of the video compression process. This allows implementing one or more of the exemplary embodiments disclosed herein in low power SoCs supporting wireless display.

The two encoders 306/307 may generate two separate packet streams 308/309.

These two separate packet streams 308/309 may be sent wirelessly to a receiver 322 from a wireless transmitter MAC layer 310 to a wireless receiver MAC layer 312.

At the receiver 322, a packet multiplexer 320 may be used in order to combine the two separate received packet streams 318/319 into a single stream. For example, the multiplexer 322 may sequence the packets correctly to combine the two separate packet streams 318/319 into a single stream, in order to present the packets in the order the decoder is expecting (e.g., one slice at a time, starting from the top of the image, until the last slice at the bottom of the image).

It will be appreciated that packet multiplexer 320 may be located either on the encoder 306/307 side or on the decoder 324 side of the communications described herein.

Modified wireless decoder 324 may take the reordered (multiplexed) packets and perform a video decoding process. Note that in some implementations the stream ID/program ID and/or first_mb_in_slice values may be different than the values used by a single video encoder (e.g., a single video encoder running at twice the clock frequency). Accordingly, such a modified decoder 324 may be adapted to support these changes in order to decode the multiplexed stream. In addition, modified decoder 324 may be adapted to support some form of digital content protection (e.g., High-bandwidth Digital Content Protection (HDCP) or the like) decryption (e.g., by either using a separate key for the left half and the right half of the screen or support skipping some counter values when transitioning from the left half to the right half of the screen, or the like).

In operation, there may be two separate streams of encoded data may be transmitted from the encoder 306/307 to modified decoder 324 for display of decoded frame 326 on a high resolution display. Similarly, the concepts described herein may be particularly suited for implementation in low power/high resolution wireless display systems. For example, the concepts described herein might support one higher resolution display and/or two low resolution displays. In hardware implementations, the concepts described herein may include two instances of a video compression engine in a system-on-chip (SoC), for example.

Additionally, in some implementations of the concepts described herein, the resultant compressed video stream may not be compliant to the Hypothetical Reference Decoder (HRD) of existing video codecs. Accordingly, in some implementations the Hypothetical Reference Decoder (HRD) may be adapted to process data being encoded and decoded as two separate streams.

By employing two video encoders running in parallel, and splitting the image into a left half and a right half (as in the figure), no additional end to end (encoder to decoder) latency may be introduced compared to running a single video encoder at twice the clock frequency. This is because for each macroblock row, the two encoders running in parallel may generate compressed packets at the same rate a single encoder with double the clock frequency would. This is in contrast to a simpler approach of encoding even frames with the 1st encoder and odd frames with the 2nd encoder. In that case, it would take the time of two video frames (instead of one video frame) until the encoded packets are ready (since it takes each encoder the time of two video frames to encode a single video frame). This means an additional latency of one video frame may be introduced, compared to the approaches presented here. The approaches presented here are particularly suited for wireless display, where low end to end latency is critical. This is since wireless display is used in interactive scenarios, e.g., moving a mouse/clicking buttons in a user interface. In these use cases, introducing another video frame of end to end latency will likely seriously degrade the user experience.

Regarding video quality, in one targeted implementation, which is wireless display using the WiGig WDE standard, there is may be no deblocking filter, and each macroblock row may be split into 8 slices (i.e. 4 slices for each half macroblock row at 3840×2160 at 60 FPS). Also, very high quality is typically used—which may target visually lossless quality. So in practice, the image is visually lossless, and there is little risk of a user detecting artifacts at the places the frame is divided in two. In addition, software may be used to monitor the quality of each of the half images generated by the encoders, and the target compressed bitrate/compressed frame size allocation can be modified in order to ensure the quality from both encoders is similar.

As will be discussed in greater detail below, video coding scheme 300 may be used to perform some or all of the various functions discussed below in connection with FIGS. 4 and/or 7.

Additional and/or alternative details regarding scheme 300 are described below in FIG. 3B.

Figure 3B:
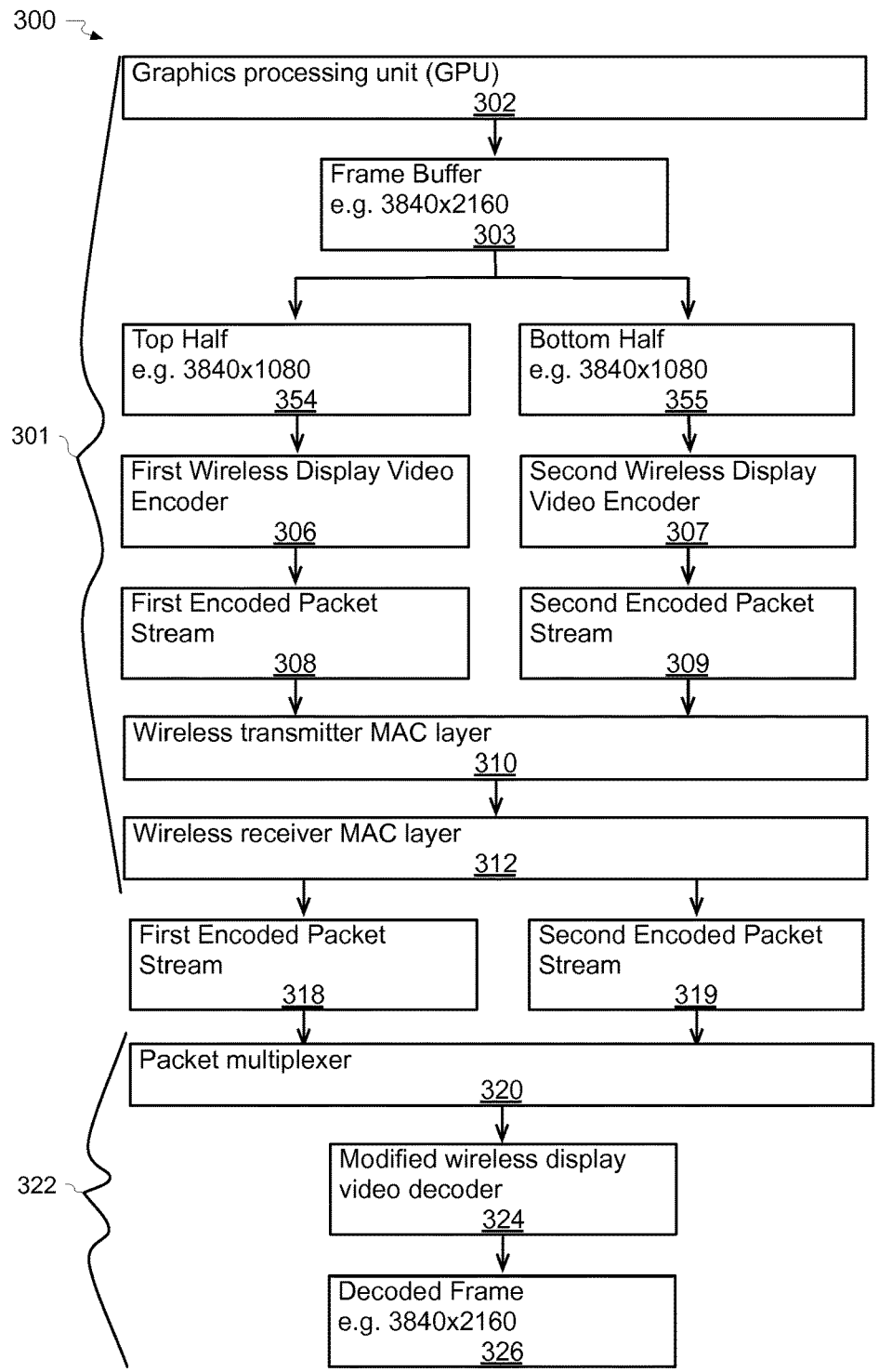
FIG. 3B is another illustrative diagram of an example video processing scheme.

FIG. 3B is a diagram illustrating an example video processing scheme 300, arranged in accordance with at least some implementations of the present disclosure. Scheme 300 may include one or more operations, functions or actions as illustrated by one or more of operations 302, etc.

At transmitter 301 side, graphics processing unit (GPU) 302 may generate a high resolution image (e.g., for 3840 by 2160 pixels (4K)) and stored in frame buffer 303.

Then the image may be split into two parts 354/355. For example, the image may be split into two parts where there is a top half and a bottom half Such an image split may be implemented in hardware, firmware, and/or software.

Next, each of the two halves 354/355 of the image may be encoded in parallel. For example, each of the two halves of the image may be encoded in parallel via two separate video encoders 306/307 that run in parallel.

In such an implementation, using two video encoders may allow for a reduced clock frequency and hence a reduced power consumption of the video compression process. This allows implementing one or more of the exemplary embodiments disclosed herein in low power SoCs supporting wireless display.

The two encoders 306/307 may generate two separate packet streams 308/309.

These two separate packet streams 308/309 may be sent wirelessly to a receiver 322 from a wireless transmitter MAC layer 310 to a wireless receiver MAC layer 312.

At the receiver 322, a packet multiplexer 320 may be used in order to combine the two separate received packet streams 318/319 into a single stream. For example, the multiplexer 322 may sequence the packets correctly to combine the two separate packet streams 318/319 into a single stream, in order to present the packets in the order the decoder is expecting (e.g., one slice at a time, starting from the top of the image, until the last slice at the bottom of the image).

It will be appreciated that packet multiplexer 320 may be located either on the encoder 306/307 side or on the decoder 324 side of the communications described herein.

Modified wireless decoder 324 may take the reordered (multiplexed) packets and perform a video decoding process. Note that in some implementations the stream ID/program ID and/or first_mb_in_slice values may be different than the values used by a single video encoder (e.g., a single video encoder running at twice the clock frequency). Accordingly, such a modified decoder 324 may be adapted to support these changes in order to decode the multiplexed stream. In addition, modified decoder 324 may be adapted to support some form of digital content protection (e.g., High-bandwidth Digital Content Protection (HDCP) or the like) decryption (e.g., by either using a separate key for the left half and the right half of the screen or support skipping some counter values when transitioning from the left half to the right half of the screen, or the like).

In operation, there may be two separate streams of encoded data may be transmitted from the encoder 306/307 to modified decoder 324 for display of decoded frame 326 on a high resolution display. Similarly, the concepts described herein may be particularly suited for implementation in low power/high resolution wireless display systems. For example, the concepts described herein might support one higher resolution display and/or two low resolution displays. In hardware implementations, the concepts described herein may include two instances of a video compression engine in a system-on-chip (SoC), for example.

Additionally, in some implementations of the concepts described herein, the resultant compressed video stream may not be compliant to the Hypothetical Reference Decoder (HRD) of existing video codecs. Accordingly, in some implementations the Hypothetical Reference Decoder (HRD) may be adapted to process data being encoded and decoded as two separate streams.

As will be discussed in greater detail below, video coding scheme 300 may be used to perform some or all of the various functions discussed below in connection with FIGS. 4 and/or 7.

Figure 4:
FIG. 4 is a flow diagram illustrating an example coding process.

FIG. 4 is a flow diagram illustrating an example coding process 400, arranged in accordance with at least some implementations of the present disclosure. Process 400 may include one or more operations, functions or actions as illustrated by one or more of operations 402, etc.

Process 400 may begin at operation 402, "Perform Frame Division of Video Frames Into Sections To Form a First Frame Section Stream and a Second Frame Section Stream", where a first and second frame section streams may be formed. For example, video frames may be divided into sections to form a first frame section stream and a second frame section stream.

Process 400 may continue at operation 404, "Encode The First Frame Section Stream Via A First Encoder And The Second Frame Section Stream Via A Second Encoder", where the first and second frame section streams may be encoded. For example, the first frame section stream may be encoded via a first encoder while the second frame section stream may be encoded via a second encoder.

Process 400 may provide for video coding, such as video encoding, decoding, and/or bitstream transmission techniques, which may be employed by a coder system as discussed herein.

Figures 5, 6:
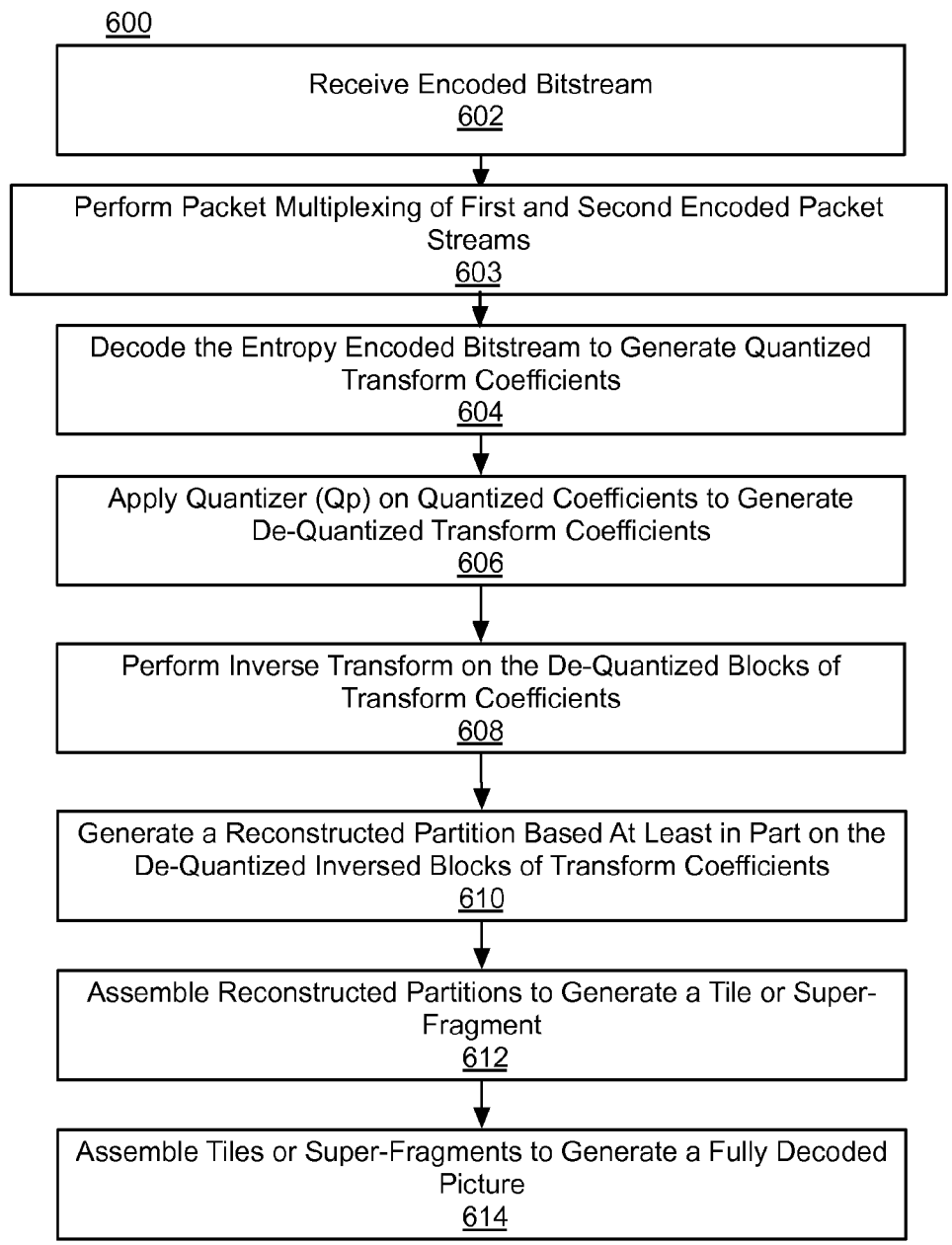
FIG. 5 illustrates an example bitstream.
FIG. 6 is a flow diagram illustrating an example decoding process.

FIG. 5 illustrates an example bitstream 500, arranged in accordance with at least some implementations of the present disclosure. In some examples, bitstream 500 may correspond to bitstream (see, e.g., encoded bitstreams 211 and/or 211' in FIG. 2) output from coder 100 and/or a corresponding input bitstream to a decoder. Although not shown in FIG. 5 for the sake of clarity of presentation, in some examples bitstream 500 may include a header portion 502 and a data portion 504. In various examples, bitstream 500 may include data, indicators, index values, mode selection data, or the like associated with encoding a video frame as discussed herein. As discussed, bitstream 500 may be generated by an encoder and/or received by a decoder for decoding such that decoded video frames may be presented via a display device.

FIG. 6 is a flow diagram illustrating an example decoding process 600, arranged in accordance with at least some implementations of the present disclosure. Process 600 may include one or more operations, functions or actions as illustrated by one or more of operations 602, etc. Process 600 may form at least part of a video coding process. By way of non-limiting example, process 600 may form at least part of a video decoding process as might be undertaken by the internal decoder loop of coder system 100 of FIG. 1 or a decoder system (not illustrated) of the same or similar design.

Process 600 may begin at operation 602, "Receive Encoded Bitstream", where a bitstream of a video sequence may be received. For example, a bitstream encoded as discussed herein may be received at a video decoder.

Process 600 may continue at operation 603, "Perform Packet Multiplexing of First and Second Encoded Packet Streams", where packet multiplexing of the first and second encoded packet streams may be performed. For example, one example of such an operation is described in greater detail below with respect to FIG. 3.

Process 600 may continue at operation 604, "Decode the Entropy Encoded Bitstream to Generate Quantized Transform Coefficients", where the bitstream may be decoded to generate quantized transform coefficients. In some examples, the decoded data may include to coding partition indicators, block size data, transform type data, quantizer (Qp), quantized transform coefficients, the like, and/or combinations thereof.

Process 600 may continue at operation 606, "Apply Quantizer (Qp) on Quantized Coefficients to Generate a De-Quantized Block of Transform Coefficients", where a quantizer (Qp) may be applied to quantized transform coefficients to generate a de-quantized block of transform coefficients.

Process 600 may continue at operation 608, "Perform Inverse Transform On the De-Quantized Blocks of Transform Coefficients", where, an inverse transform may be performed on each de-quantized block of transform coefficients. For example, performing the inverse transform may include an inverse transform process similar to or the same as the inverse of any forward transform used for encoding as discussed herein.

Process 600 may continue at operation 610, "Generate a Reconstructed Partition based at least in part on the De-Quantized and Inversed Blocks of Transform Coefficients", where a reconstructed prediction partition may be generated based at least in part on the de-quantized and inversed block of transform coefficients. For example, a prediction partition may be added to the decoded prediction error data partition, which is represented by a given de-quantized and inversed block of transform coefficients, to generate a reconstructed prediction partition.

Process 600 may continue at operation 612, "Assemble Reconstructed Partitions to Generate a Tile or Super-Fragment", where the reconstructed prediction partitions may be assembled to generate a tile or super-fragment. For example, the reconstructed prediction partitions may be assembled to generate tiles or super-fragments.

Process 600 may continue at operation 614, "Assemble Tiles or Super-Fragments Generate a Fully Decoded Picture", where the tiles or super-fragments of a picture may be assembled (and/or further processed) to generate a fully decoded picture. For example, after optional filtering (e.g., deblock filtering, quality restoration filtering, and/or the like), tiles or super-fragments may be assembled to generate a full decoded picture, which may be stored via a decoded picture buffer (not shown) and/or transmitted for presentment via a display device after picture reorganization.

In operation, the de-quantization may be performed by de-quantization and inverse transform module 110 of FIG. 1, and/or by a similar or identical module in a decoder with structure corresponding to the internal decoder loop of coder system 100 of FIG. 1. Similarly, in some implementations, the inverse transform of Process 600 may be performed by de-quantization and inverse transform module 110 of FIG. 1, and/or by a similar or identical module in a decoder with structure corresponding to the internal decoder loop of coder system 100 of FIG. 1. Those skilled in the art may recognize that de-quantization is achieved by scaling and saturation of the quantized transform coefficients output by 604 in FIG. 6; the inverse transformation process acting on the de-quantized data may be similar to the forward transformation of 108 in operation but with a different transformation matrix.

Some additional and/or alternative details related to process 400, 600 and other processes discussed herein may be illustrated in one or more examples of implementations discussed herein and, in particular, with respect to FIG. 7 below.

Figure 7A:
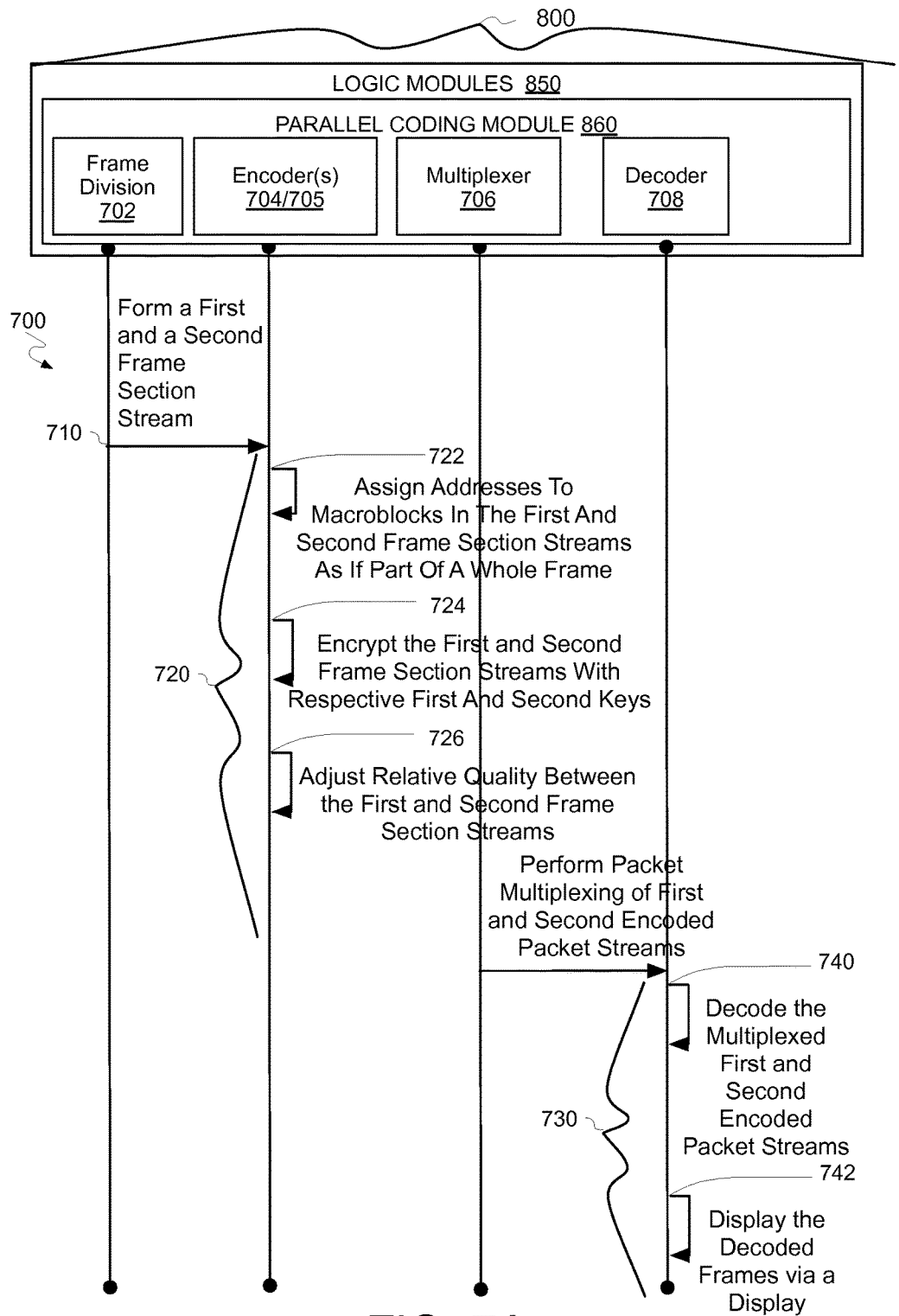
FIG. 7A provides an illustrative diagram of an example video coding system and video coding process in operation.

FIG. 7A provides an illustrative diagram of an example video coding system 800 (see, e.g., FIG. 8 for more details) and video coding process 700 in operation, arranged in accordance with at least some implementations of the present disclosure. In the illustrated implementation, process 700 may include one or more operations, functions or actions as illustrated by one or more of actions 710, etc.

By way of non-limiting example, process 700 will be described herein with reference to example video coding system 800 including coder 100 of FIG. 1, as is discussed further herein below with respect to FIG. 8. In various examples, process 700 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

As illustrated, video coding system 800 (see, e.g., FIG. 8 for more details) may include logic modules 850. For example, logic modules 850 may include any modules as discussed with respect to any of the coder systems or subsystems described herein. For example, logic modules 850 may include a parallel coding logic module 860 and/or the like.

Process 700 may begin at operation 710, "Form a First and a Second Frame Section Stream", where a first and second frame section streams may be formed. For example, frame division module 702 may perform frame division of video frames into sections to form a first frame section stream and a second frame section stream.

Process 700 may proceed from operation 710 to continue at operation 720, "Encode The First Frame Section Stream Via A First Encoder And The Second Frame Section Stream Via A Second Encoder", where the first and second frame section streams may be encoded. For example, the first frame section stream may be encoded via a first encoder 704 while the second frame section stream may be encoded via a second encoder 705.

Process 700 may proceed from operation 720 to continue at operation 730, "Perform Packet Multiplexing of First and Second Encoded Packet Streams", where the first and second encoded packet streams may be multiplexed. For example, the first and second encoded packet streams may be multiplexed via multiplexer 706 adapted to process packet streams where frames were split into portions processed by separate encoders.

In some implementations, multiplexer 706 may be configured to arrange the packets in the correct order so they can be decoded. For example, multiplexer 706 may sequence the packets correctly to combine two separate packet streams into a single stream, in order to present the packets in the order the decoder 708 is expecting (e.g., one slice at a time, starting from the top of the image, until the last slice at the bottom of the image).

Process 700 may proceed from operation 730 to continue at operation 740, "Decode the Multiplexed First and Second Encoded Packet Streams", where the multiplexed first and second encoded packet streams may be decoded. For example, the multiplexed first and second encoded packet streams may be decoded via decoder 708.

Additional and/or alternative operations for video coding process 700 are further discussed below with regard to FIG. 7B.

Figure 7B:
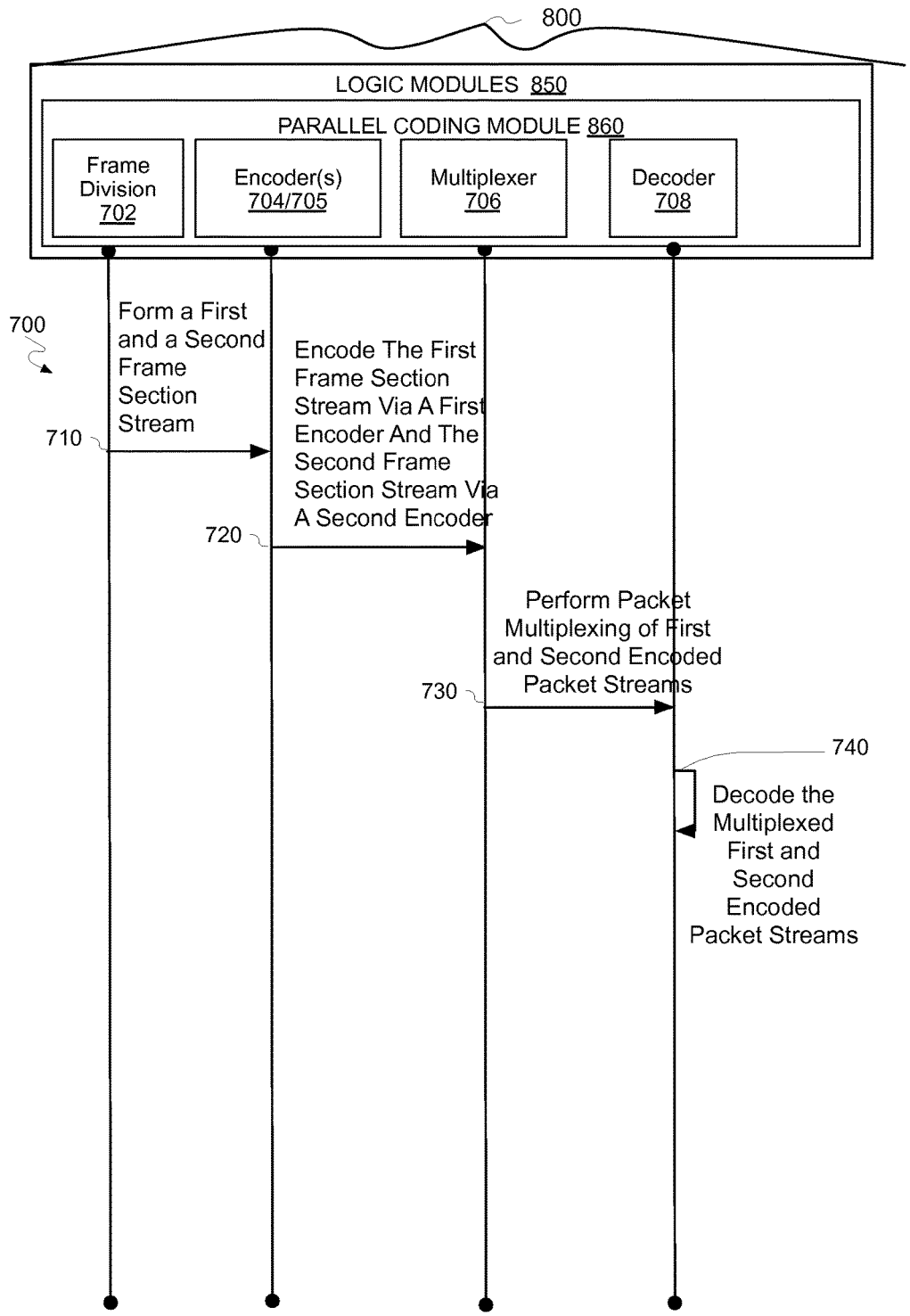
FIG. 7B provides another illustrative diagram of an example video coding system and video coding process in operation.

FIG. 7B provides another illustrative diagram of an example video coding system 800 (see, e.g., FIG. 8 for more details) and video coding process 700 in operation, arranged in accordance with at least some implementations of the present disclosure. In the illustrated implementation, process 700 may include one or more operations, functions or actions as illustrated by one or more of actions 712, etc.

By way of non-limiting example, process 700 will be described herein with reference to example video coding system 800 including coder 100 of FIG. 1, as is discussed further herein below with respect to FIG. 8. In various examples, process 700 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

As illustrated, video coding system 800 (see, e.g., FIG. 8 for more details) may include logic modules 850. For example, logic modules 850 may include any modules as discussed with respect to any of the coder systems or subsystems described herein. For example, logic modules 850 may include a parallel coding logic module 860 and/or the like.

Process 700 may begin at operation 710, "Form a First and a Second Frame Section Stream", where a first and second frame section streams may be formed. For example, frame division module 702 may perform frame division of video frames into sections to form a first frame section stream and a second frame section stream.

Process 700 may proceed from operation 710 to continue at operation 720, where the first and second frame section streams may be encoded. For example, the first frame section stream may be encoded via a first encoder 704 while the second frame section stream may be encoded via a second encoder 705.

In some implementations, the frame division may be performed based on a left/right division of the video frames. Alternatively, the frame division may be performed based on a top/bottom division of the video frames.

Operation 720 may optionally include operation 722, "Assign Addresses To Macroblocks In The First And Second Frame Section Streams As If Part Of A Whole Frame", where addresses to macroblocks in the first frame section stream as if the first frame section may be assigned. For example, the first encoder may assign addresses to macroblocks in the first frame section stream as if the first frame section were being encoded as part of a whole frame. Similarly, the second encoder may assign addresses to macroblocks in the second frame section stream as if the second frame section were being encoded as part of the same whole frame.

Operation 720 may optionally include operation 724, "Encrypt the First and Second Frame Section Streams With Respective First And Second Keys", where the first and second encoded packet streams may be encrypted with respective first and second keys. For example, the first encoder may encrypt the first frame section stream based at least in part on a first High-bandwidth Digital Content Protection (HDCP) key. Similarly, the second encoder may encrypt the second frame section stream based at least in part on a second High-bandwidth Digital Content Protection (HDCP) key.

Operation 720 may optionally include operation 726, "Adjust Relative Quality Between the First and Second Frame Section Streams", where the relative quality of the first and second encoded packet streams may be adjusted with respect to one another. For example, a rate controller portion of encoders 704/705 may adjust a relative quality between the first frame section stream and the second frame section stream based at least in part on a first quantization parameter associated with the first frame section stream and a different second quantization parameter associated with the second frame section stream.

Process 700 may proceed from operation 720 to continue at operation 730, "Perform Packet Multiplexing of First and Second Encoded Packet Streams", where the first and second encoded packet streams may be multiplexed. For example, the first and second encoded packet streams may be multiplexed via multiplexer 706 adapted to process packet streams where frames were split into portions processed by separate encoders.

In some implementations, multiplexer 706 may implement packet multiplexing of the first and second packet streams based at least in part on rewriting packet headers in the first and second frame section stream so the individual macroblocks appear to form a single multiplexed stream. For example, the re-writing done by multiplexer 706 will typically not be in the macroblock level, but in the packet level. In one example, in WDE, there may be a packet sequence number (where packets contain in general several macroblocks) and the sequence numbers from both streams may need to be merged so that you will have 0, 1, 2, 3, 4, 5 at the muxtiplexer output (e.g. instead of 0, 1, 2 for the first encoder and 2, 3, 4 for the second encoder; note that the two sequence number series are not connected in any way).

It will be appreciated that multiplexer 706 may be located either on the encoder 704/705 side or on the decoder 708 side of the communications described herein.

Process 700 may proceed from operation 730 to continue at operation 740, "Decode the Multiplexed First and Second Encoded Packet Streams", where the multiplexed first and second encoded packet streams may be decoded. For example, the multiplexed first and second encoded packet streams may be decoded via decoder 708.

In some implementations, decoder 708 may decrypt frames from the multiplexed stream, wherein the first frame section stream may be decrypted based at least in part on the first High-bandwidth Digital Content Protection (HDCP) key and the second frame section stream may be decrypted based at least in part on a second High-bandwidth Digital Content Protection (HDCP) key.

In some implementations, decoder 708 may ignore non-essential data artifacts of the frame division in the multiplexed stream so as to be capable of toggling between the first and second frame section stream. For example, decoder 708 may be modified to ignore non-essential data artifacts of the frame division, such as, for example, different packet sequence numbers, different programID, different streamID, different HDCP encryption keys, different macroblock locations in the image, the like, and/or combinations thereof, in order to be capable of toggling between the first and second frame section stream to decode two separately generated half-images into one image (e.g., by toggling between different packet sequence numbers, different programID, different streamID, different HDCP encryption keys, and/or different macroblock locations in the image). This would allow not making changes to the encoder (e.g., each encoder 704/705 may encode its own half of the image, but if you put the two streams together you don't get the same output as would be the case with a single large encoded image). Instead, in such an example, decoder 708 may be modified in order to accept two half images and combine them inside decoder 708.

Process 700 may proceed from operation 740 to continue at operation 742, "Displaying The Decoded Frames Via A Display", where the decoded frames may be displayed. For example, the decoded frames may be displayed via a display (not illustrated).

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated. Additionally, although one particular set of blocks or actions is illustrated as being associated with particular modules, these blocks or actions may be associated with different modules than the particular modules illustrated here.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 4, 6, and 7 in response to instructions conveyed to the processor by a computer readable medium.

Figure 8:
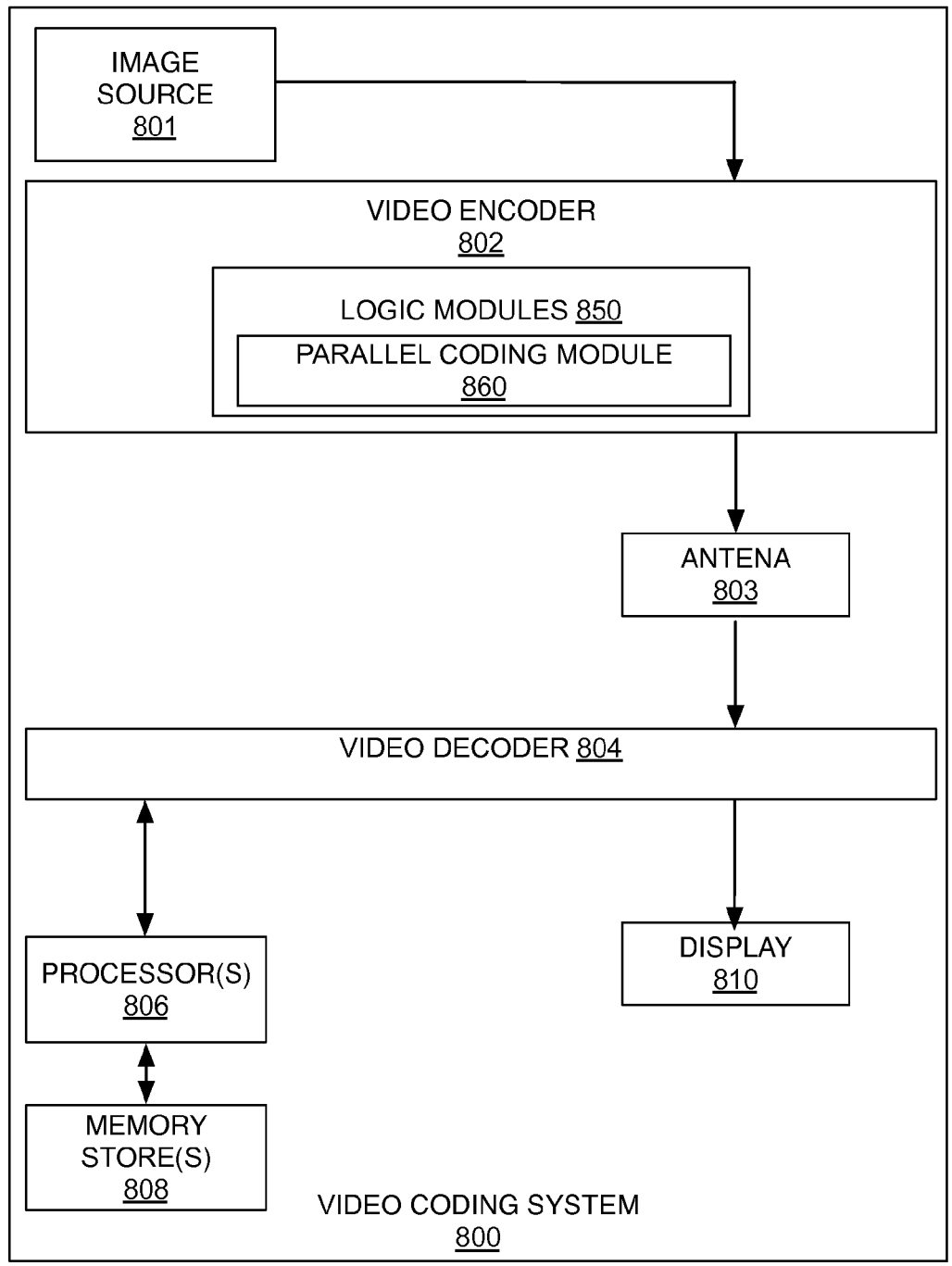
FIG. 8 is an illustrative diagram of an example video coding system.

FIG. 8 is an illustrative diagram of example video coding system 800, arranged in accordance with at least some implementations of the present disclosure. In the illustrated implementation, video coding system 800, although illustrated with both video encoder 802 and video decoder 804, video coding system 800 may include only video encoder 802 or only video decoder 804 in various examples. Video coding system 800 (which may include only video encoder 802 or only video decoder 804 in various examples) may include image source 801 (e.g., a GPU-type image source), an antenna 803, one or more processor(s) 806, one or more memory store(s) 808, and/or a display device 810. As illustrated, image source 801, antenna 803, video encoder 802, video decoder 804, processor(s) 806, memory store(s) 808, and/or display device 810 may be capable of communication with one another.

In some implementations, video coding system 800 may include antenna 803. For example, antenna 803 may be configured to transmit or receive an encoded bitstream of video data, for example. Processor(s) 806 may be any type of processor and/or processing unit. For example, processor(s) 806 may include distinct central processing units, distinct graphic processing units, integrated system-on-a-chip (SoC) architectures, the like, and/or combinations thereof. In addition, memory store(s) 808 may be any type of memory. For example, memory store(s) 808 may be volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 808 may be implemented by cache memory. Further, in some implementations, video coding system 800 may include display device 810. Display device 810 may be configured to present video data.

As shown, in some examples, video coding system 800 may include logic modules 850. While illustrated as being associated with video encoder 802, video decoder 804 may similarly be associated with identical and/or similar logic modules as the illustrated logic modules 850. Accordingly, video decoder 804 may include all or portions of logic modules 850. For example, antenna 803, video decoder 804, processor(s) 806, memory store(s) 808, and/or display 810 may be capable of communication with one another and/or communication with portions of logic modules 850. Similarly, video encoder 802 may include identical and/or similar logic modules to logic modules 850. For example, image source 801 and video encoder 802 may be capable of communication with one another and/or communication with logic modules that are identical and/or similar to logic modules 850.

In some implementations, logic modules 850 may embody various modules as discussed with respect to any system or subsystem described herein. In various embodiments, some of logic modules 850 may be implemented in hardware, while software may implement other logic modules. For example, in some embodiments, some of logic modules 850 may be implemented by application-specific integrated circuit (ASIC) logic while other logic modules may be provided by software instructions executed by logic such as processors 806. However, the present disclosure is not limited in this regard and some of logic modules 850 may be implemented by any combination of hardware, firmware and/or software.

Figure 9:
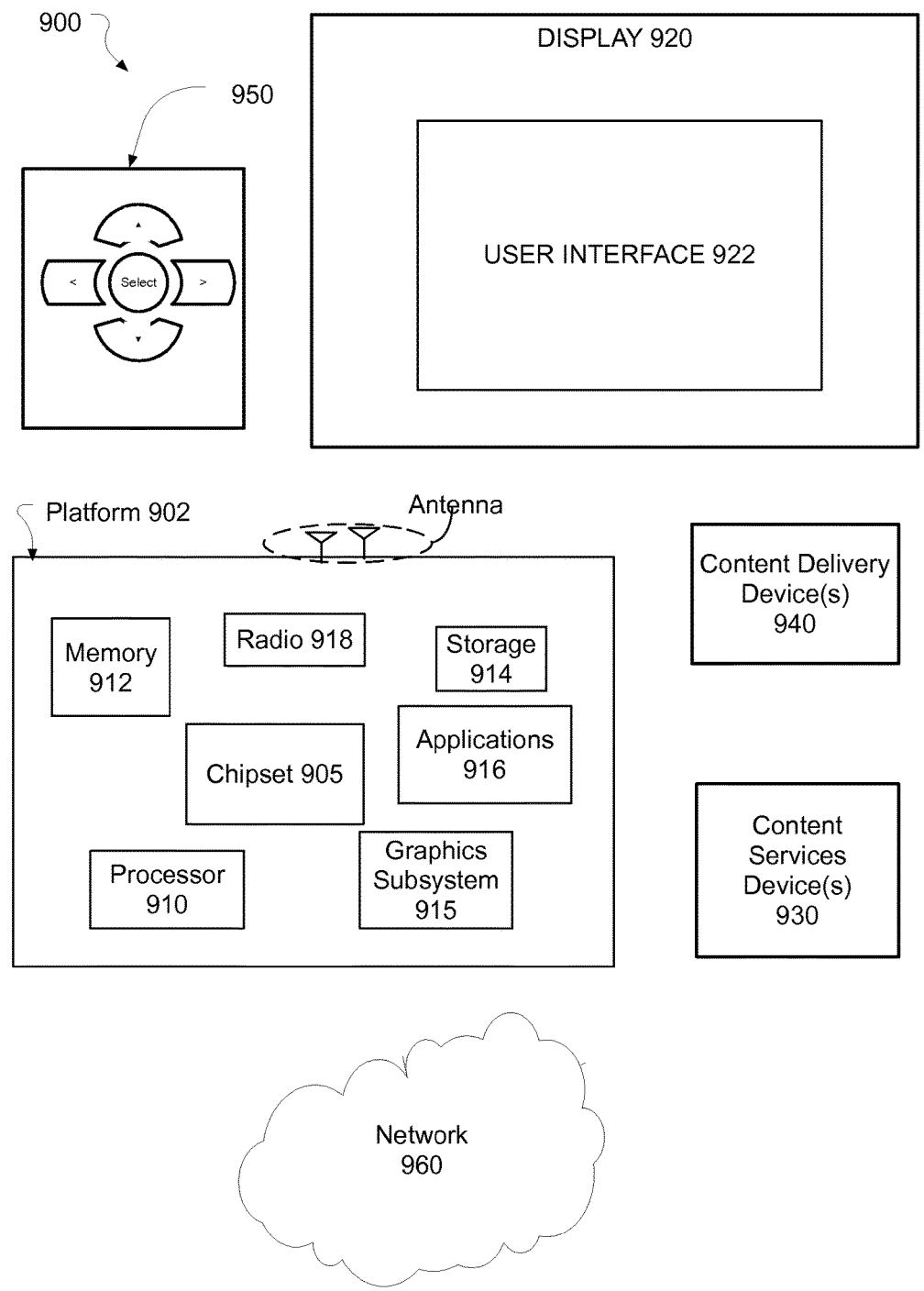
FIG. 9 is an illustrative diagram of an example system.

FIG. 9 is an illustrative diagram of an example system 900, arranged in accordance with at least some implementations of the present disclosure. In various implementations, system 900 may be a media system although system 900 is not limited to this context. For example, system 900 may be incorporated into a personal computer (PC), laptop computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, WiGig wireless display extension (WDE), and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In various embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922. In various embodiments, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off" In addition, chipset 905 may include hardware and/or software support for (5.1) surround sound audio and/or high definition (7.1) surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
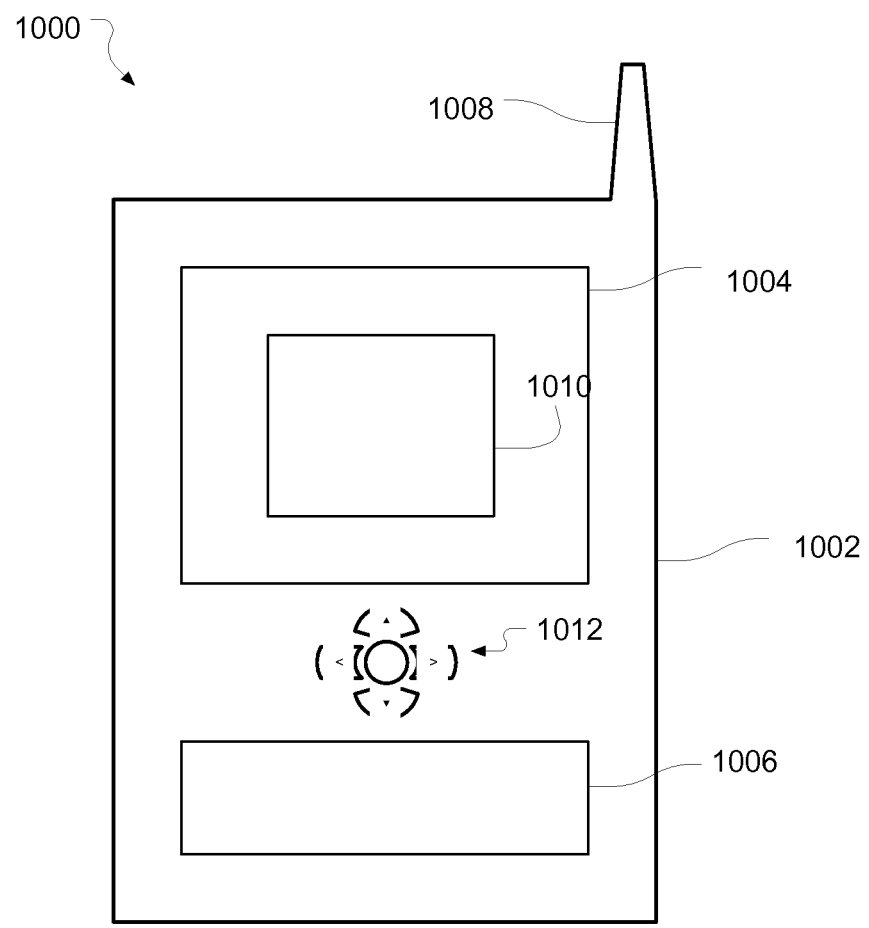
FIG. 10 is an illustrative diagram of an example system, all arranged in accordance with at least some implementations of the present disclosure.

As described above, system 900 may be embodied in varying physical styles or form factors. FIG. 10 illustrates implementations of a small form factor device 1000 in which system 1000 may be embodied. In various embodiments, for example, device 1000 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing 1002, a display 1004 which may include a user interface 1010, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, image sensors, and so forth. Information also may be entered into device 1000 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems as discussed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for parallel coding for wireless displays may include performing, via a frame division module, frame division of video frames into sections to form a first frame section stream and a second frame section stream; and/or encoding, via a first and a second encoder, the first frame section stream via the first encoder and the second frame section stream via the second encoder.

In another example, a computer-implemented method for parallel coding for wireless displays may further include the frame division being performed based on a left/right division of the video frames or based on a top/bottom division of the video frames. A rate controller may adjust a relative quality between the first frame section stream and the second frame section stream based at least in part on a first quantization parameter associated with the first frame section stream and a different second quantization parameter associated with the second frame section stream. The first encoder may assign addresses to macroblocks in the first frame section stream as if the first frame section were being encoded as part of a whole frame; and the second encoder may assign addresses to macroblocks in the second frame section stream as if the second frame section were being encoded as part of the same whole frame. The first encoder may encrypt the first frame section stream based at least in part on a first High-bandwidth Digital Content Protection (HDCP) key; and the second encoder may encrypt the second frame section stream based at least in part on a second High-bandwidth Digital Content Protection (HDCP) key. A multiplexer may perform packet multiplexing of the first and second packet streams based at least in part on rewriting packet headers in the first and second frame section stream so the individual macroblocks appear to form a single multiplexed stream. The decoder may ignore non-essential data artifacts of the frame division in the multiplexed stream so as to be capable of toggling between the first and second frame section stream. The decoder may decrypt frames from the multiplexed stream, where the first frame section stream is decrypted based at least in part on a first High-bandwidth Digital Content Protection (HDCP) key and the second frame section stream is decrypted based at least in part on a second High-bandwidth Digital Content Protection (HDCP) key. A display may display the decoded frames.

In other examples, a system for parallel coding for wireless displays may include a wireless transmitter configured to transmit coded video data; one or more processors communicatively coupled to the wireless transmitter; one or more memory stores communicatively coupled to the one or more processors; a frame division module of a video coder communicatively coupled to the one or more processors and configured to perform frame division of video frames into sections to form a first frame section stream and a second frame section stream; and/or a first and a second encoder of the video coder communicatively coupled to the one or more processors and configured to encode the first frame section stream via the first encoder and the second frame section stream via the second encoder.

In another example, the system for parallel coding for wireless displays may further include the frame division being performed based on a left/right division of the video frames or based on a top/bottom division of the video frames. A rate controller of the video coder may be communicatively coupled to the one or more processors and configured to adjust a relative quality between the first frame section stream and the second frame section stream based at least in part on a first quantization parameter associated with the first frame section stream and a different second quantization parameter associated with the second frame section stream. The first encoder may be further configured to assign addresses to macroblocks in the first frame section stream as if the first frame section were being encoded as part of a whole frame; and the second encoder may be further configured to assign addresses to macroblocks in the second frame section stream as if the second frame section were being encoded as part of the same whole frame. The first encoder may be further configured to encrypt the first frame section stream based at least in part on a first High-bandwidth Digital Content Protection (HDCP) key; and the second encoder may be further configured to encrypt the second frame section stream based at least in part on a second High-bandwidth Digital Content Protection (HDCP) key. A multiplexer of the video coder communicatively coupled to the one or more processors and configured to perform packet multiplexing of the first and second packet streams based at least in part on rewriting packet headers in the first and second frame section stream so the individual macroblocks appear to form a single multiplexed stream.

In a further example, a system for parallel decoding for wireless displays may include a display device configured to present decoded video data; one or more processors communicatively coupled to the display device; one or more memory stores communicatively coupled to the one or more processors; and/or a decoder communicatively coupled to the one or more processors and configured to: receive a the output of a frame division of video frames into sections to form a first frame section stream and a second frame section stream; and configured to ignore non-essential data artifacts of the frame division in a multiplexed stream of the first and second frame section stream so as to be capable of toggling between the first and second frame section streams.

In a still further example, the system for parallel decoding for wireless displays may further include the frame division being based on a left/right division of the video frames or based on a top/bottom division of the video frames. A multiplexer of the video decoder may be communicatively coupled to the one or more processors and configured to perform packet multiplexing of the first and second packet streams based at least in part on rewriting packet headers in the first and second frame section stream so the individual macroblocks appear to form a single multiplexed stream. The decoder may further be configured to decrypt frames from the multiplexed stream, where the first frame section stream is decrypted based at least in part on a first High-bandwidth Digital Content Protection (HDCP) key and the second frame section stream is decrypted based at least in part on a second High-bandwidth Digital Content Protection (HDCP) key. A display may be communicatively coupled to the one or more processors and configured to display the decoded frames In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for parallel coding for wireless displays, comprising:
    performing, via a frame division module, frame division of video frames into only two sections to form a first frame section stream and a second frame section stream;
    encoding, via a first and a second encoder, the first frame section stream via the first encoder and the second frame section stream via the second encoder, wherein the first frame section stream is encoded by the first encoder isolated from the second stream and the second frame section stream is encoded by the second encoder isolated from the first stream in such a way that the first and second encoder running in parallel are capable of generating compressed packets at the same rate as a single encoder having a doubled clock frequency; and
    ignoring, via a decoder, non-essential data artifacts of the frame division in a single multiplexed stream of the first and second frame section stream to toggle back and forth between a first part of the first frame section stream and a first part of second frame section stream then a second part of the first frame section stream and a second part of second frame section stream based on a left/right division of the video frames while ignoring the non-essential data artifacts to decode two separately generated half-images of the first and second frame section streams into one decoded image, wherein the non-essential data artifacts of the frame division include non-coordinating packet sequence numbers between the first and second frame section stream.

2. The method of claim 1, further comprising:
adjusting, via a rate controller, a relative quality between the first frame section stream and the second frame section stream based at least in part on a first quantization parameter associated with the first frame section stream and a different second quantization parameter associated with the second frame section stream.

3. The method of claim 1, further comprising:
assigning, via the first encoder, addresses to macroblocks in the first frame section stream as if the first frame section were being encoded as part of a whole frame; and
assigning, via the second encoder, addresses to macroblocks in the second frame section stream as if the second frame section were being encoded as part of the same whole frame.

4. The method of claim 1, further comprising:
encrypting, via the first encoder, the first frame section stream based at least in part on a first High-bandwidth Digital Content Protection (HDCP) key; and
encrypting, via the second encoder, the second frame section stream based at least in part on a second High-bandwidth Digital Content Protection (HDCP) key.

5. The method of claim 1, further comprising:
performing, via a multiplexer, packet multiplexing of the first and second packet streams based at least in part on rewriting packet headers in the first and second frame section stream so individual macroblocks appear to form a single multiplexed stream.

6. The method of claim 1, further comprising:
decrypting, via a decoder, frames from a multiplexed stream, wherein the first frame section stream is decrypted based at least in part on a first High-bandwidth Digital Content Protection (HDCP) key and the second frame section stream is decrypted based at least in part on a second High-bandwidth Digital Content Protection (HDCP) key.

7. The method of claim 1, further comprising:
adjusting, via a rate controller, a relative quality between the first frame section stream and the second frame section stream based at least in part on a first quantization parameter associated with the first frame section stream and a different second quantization parameter associated with the second frame section stream;
assigning, via the first encoder, addresses to macroblocks in the first frame section stream as if the first frame section were being encoded as part of a whole frame; and assigning, via the second encoder, addresses to macroblocks in the second frame section stream as if the second frame section were being encoded as part of the same whole frame;
encrypting, via the first encoder, the first frame section stream based at least in part on a first High-bandwidth Digital Content Protection (HDCP) key; and encrypting, via the second encoder, the second frame section stream based at least in part on a second High-bandwidth Digital Content Protection (HDCP) key;
performing, via a multiplexer, packet multiplexing of the first and second packet streams based at least in part on rewriting packet headers in the first and second frame section stream so individual macroblocks appear to form a single multiplexed stream;
decrypting, via the decoder, frames from the multiplexed stream, wherein the first frame section stream is decrypted based at least in part on a first High-bandwidth Digital Content Protection (HDCP) key and the second frame section stream is decrypted based at least in part on a second High-bandwidth Digital Content Protection (HDCP) key; and
displaying, via a display, the decoded frames.

8. A system for parallel coding for wireless displays, comprising:
a wireless transmitter configured to transmit coded video data;
one or more processors communicatively coupled to the wireless transmitter;
one or more memory stores communicatively coupled to the one or more processors;
a frame division module of a video coder communicatively coupled to the one or more processors and configured to perform frame division of video frames into only two sections to form a first frame section stream and a second frame section stream;
a first and a second encoder of the video coder communicatively coupled to the one or more processors and configured to encode the first frame section stream via the first encoder and the second frame section stream via the second encoder, wherein the first frame section stream is encoded by the first encoder isolated from the second stream and the second frame section stream is encoded by the second encoder isolated from the first stream in such a way that the first and second encoder running in parallel are capable of generating compressed packets at the same rate as a single encoder having a doubled clock frequency; and
a decoder communicatively coupled to the one or more processors and configured to: receive an output of a frame division of video frames into sections to form a first frame section stream and a second frame section stream, wherein the first frame section stream was encoded by a first encoder isolated from the second stream and the second frame section stream was encoded by a second encoder isolated from the first stream; and configured to ignore non-essential data artifacts of the frame division in a single multiplexed stream of the first and second frame section stream to toggle back and forth between a first part of the first frame section stream and a first part of second frame section streams then a second part of the first frame section stream and a second part of second frame section stream based on a left/right division of the video frames while ignoring the non-essential data artifacts to decode two separately generated half-images of the first and second frame section streams into one decoded image, wherein the non-essential data artifacts of the frame division include non-coordinating packet sequence numbers between the first and second frame section stream.

9. The system of claim 8, further comprising:
a rate controller of the video coder communicatively coupled to the one or more processors and configured to adjust a relative quality between the first frame section stream and the second frame section stream based at least in part on a first quantization parameter associated with the first frame section stream and a different second quantization parameter associated with the second frame section stream.

10. The system of claim 8,
wherein the first encoder is further configured to assign addresses to macroblocks in the first frame section stream as if the first frame section were being encoded as part of a whole frame; and
wherein the second encoder is further configured to assign addresses to macroblocks in the second frame section stream as if the second frame section were being encoded as part of the same whole frame.

11. The system of claim 8,
wherein the first encoder is further configured to encrypt the first frame section stream based at least in part on a first High-bandwidth Digital Content Protection (HDCP) key; and
wherein the second encoder is further configured to encrypt the second frame section stream based at least in part on a second High-bandwidth Digital Content Protection (HDCP) key.

12. The system of claim 8, further comprising:
a multiplexer of the video coder communicatively coupled to the one or more processors and configured to perform packet multiplexing of the first and second packet streams based at least in part on rewriting packet headers in the first and second frame section stream so individual macroblocks appear to form a single multiplexed stream.

13. The system of claim 8, further comprising:
a rate controller of the video coder communicatively coupled to the one or more processors and configured to adjust a relative quality between the first frame section stream and the second frame section stream based at least in part on a first quantization parameter associated with the first frame section stream and a different second quantization parameter associated with the second frame section stream;
wherein the first encoder is further configured to assign addresses to macroblocks in the first frame section stream as if the first frame section were being encoded as part of a whole frame;
wherein the second encoder is further configured to assign addresses to macroblocks in the second frame section stream as if the second frame section were being encoded as part of the same whole frame;
wherein the first encoder is further configured to encrypt the first frame section stream based at least in part on a first High-bandwidth Digital Content Protection (HDCP) key;
wherein the second encoder is further configured to encrypt the second frame section stream based at least in part on a second High-bandwidth Digital Content Protection (HDCP) key; and
a multiplexer of the video coder communicatively coupled to the one or more processors and configured to perform packet multiplexing of the first and second packet streams based at least in part on rewriting packet headers in the first and second frame section stream so individual macroblocks appear to form a single multiplexed stream.

14. A system for parallel decoding for wireless displays, comprising:
a display device configured to present decoded video data;
one or more processors communicatively coupled to the display device;
one or more memory stores communicatively coupled to the one or more processors; and
a decoder communicatively coupled to the one or more processors and configured to: receive an output of a frame division of video frames into only two sections to form a first frame section stream and a second frame section stream, wherein the first frame section stream was encoded by a first encoder isolated from the second stream and the second frame section stream was encoded by a second encoder isolated from the first stream; and configured to ignore non-essential data artifacts of the frame division in a single multiplexed stream of the first and second frame section stream to toggle back and forth between a first part of the first frame section stream and a first part of second frame section streams then a second part of the first frame section stream and a second part of second frame section stream based on a left/right division of the video frames while ignoring the non-essential data artifacts to decode two separately generated half-images of the first and second frame section streams into one decoded image, wherein the non-essential data artifacts of the frame division include non-coordinating packet sequence numbers between the first and second frame section stream.

15. The system of claim 14, further comprising:
a multiplexer of the decoder communicatively coupled to the one or more processors and configured to perform packet multiplexing of the first and second packet streams based at least in part on rewriting packet headers in the first and second frame section stream so individual macroblocks appear to form a single multiplexed stream.

16. The system of claim 14, further comprising:
a multiplexer of the video decoder communicatively coupled to the one or more processors and configured to perform packet multiplexing of the first and second packet streams based at least in part on rewriting packet headers in the first and second frame section stream so individual macroblocks appear to form a single multiplexed stream.

17. The system of claim 14, further comprising:
wherein the decoder is further configured to decrypt frames from a multiplexed stream, wherein the first frame section stream is decrypted based at least in part on a first High-bandwidth Digital Content Protection (HDCP) key and the second frame section stream is decrypted based at least in part on a second High-bandwidth Digital Content Protection (HDCP) key.

18. The system of claim 14, further comprising:
a multiplexer of the video decoder communicatively coupled to the one or more processors and configured to perform packet multiplexing of the first and second packet streams based at least in part on rewriting packet headers in the first and second frame section stream so individual macroblocks appear to form a single multiplexed stream;
wherein the decoder is further configured to decrypt frames from the multiplexed stream, wherein the first frame section stream is decrypted based at least in part on a first High-bandwidth Digital Content Protection (HDCP) key and the second frame section stream is decrypted based at least in part on a second High-bandwidth Digital Content Protection (HDCP) key; and
a display communicatively coupled to the one or more processors and configured to display the decoded frames.

19. At least one non-transitory machine readable medium comprising: a plurality of instructions that in response to being executed on a computing device, causes the computing device to perform:
performing, via a frame division module, frame division of video frames into only two sections to form a first frame section stream and a second frame section stream;
encoding, via a first and a second encoder, the first frame section stream via the first encoder and the second frame section stream via the second encoder, wherein the first frame section stream is encoded by the first encoder isolated from the second stream and the second frame section stream is encoded by the second encoder isolated from the first stream in such a way that the first and second encoder running in parallel are capable of generating compressed packets at the same rate as a single encoder having a doubled clock frequency; and
ignoring, via a decoder, non-essential data artifacts of the frame division in a single multiplexed stream to toggle back and forth between a first part of the first frame section stream and a first part of second frame section stream then a second part of the first frame section stream and a second part of second frame section stream based on a left/right division of the video frames while ignoring the non-essential data artifacts to decode two separately generated half-images of the first and second frame section streams into one decoded image, wherein the non-essential data artifacts of the frame division include non-coordinating packet sequence numbers between the first and second frame section stream.

20. The at least one non-transitory machine readable medium of claim 19, further comprising:
adjusting, via a rate controller, a relative quality between the first frame section stream and the second frame section stream based at least in part on a first quantization parameter associated with the first frame section stream and a different second quantization parameter associated with the second frame section stream;
assigning, via the first encoder, addresses to macroblocks in the first frame section stream as if the first frame section were being encoded as part of a whole frame; and assigning, via the second encoder, addresses to macroblocks in the second frame section stream as if the second frame section were being encoded as part of the same whole frame;
encrypting, via the first encoder, the first frame section stream based at least in part on a first High-bandwidth Digital Content Protection (HDCP) key; and encrypting, via the second encoder, the second frame section stream based at least in part on a second High-bandwidth Digital Content Protection (HDCP) key;
performing, via a multiplexer, packet multiplexing of the first and second packet streams based at least in part on rewriting packet headers in the first and second frame section stream so individual macroblocks appear to form a single multiplexed stream;
decrypting, via a decoder, frames from the multiplexed stream, wherein the first frame section stream is decrypted based at least in part on a first High-bandwidth Digital Content Protection (HDCP) key and the second frame section stream is decrypted based at least in part on a second High-bandwidth Digital Content Protection (HDCP) key; and
displaying, via a display, the decoded frames.

* * * * *